United States Patent [19]

Hite et al.

[11] 3,709,327
[45] Jan. 9, 1973

[54] METHOD AND SYSTEM FOR SORTING SPHERICAL ARTICLES

[75] Inventors: Edward Lee Hite, Toledo; Dennis Lee Ramge, Waterville; Andre Roelf De Muinck, Defiance, all of Ohio

[73] Assignee: Johns-Manville Corporation, New York, N.Y.

[22] Filed: Jan. 21, 1971

[21] Appl. No.: 108,450

[52] U.S. Cl. ..................209/73, 209/74, 209/80, 209/100, 209/356
[51] Int. Cl. .............................................B07b 13/04
[58] Field of Search....209/100, 103, 90, 82, 71, 356, 209/362, 80, 93, 123, 73; 193/28, 31

[56] References Cited

UNITED STATES PATENTS

| 1,138,245 | 5/1915 | Parsons | 209/93 |
| 3,412,855 | 11/1968 | Nilmeier et al. | 209/100 X |
| 3,463,312 | 8/1969 | Barton | 209/103 |

FOREIGN PATENTS OR APPLICATIONS

| 91,303 | 1/1938 | Sweden | 209/90 |

Primary Examiner—Allen N. Knowles
Attorney—John A. McKinney and Robert M. Krone

[57] ABSTRACT

A system and method for sorting spherical articles from a bulk supply of articles is disclosed in a preferred embodiment wherein spheres of a generally uniform size are fed from a bulk supply source to a separator hopper which separates out non-spherical and foreign materials by use of a series of curved equally spaced guides nested in an enclosure whereby over sized foreign materials particularly those of substantial length are restricted and the spherical articles are passed to a metering orifice having as a lower margin a flexible rough surfaced belt driven to transport the passed material to a grading bar. The grading bar is positioned above the belt a distance slightly less than the diameter of the spherical articles to allow under sized and non-rolling material to pass thereunder as the belt travels beneath the grading bar while spherical articles are advanced by engagement with the grading bar in a single file to a collection point.

27 Claims, 4 Drawing Figures

PATENTED JAN 9 1973

INVENTORS
EDWARD L. HITE
DENNIS L. RAMGE
ANDRE R. DeMUINCK

BY John A. McKinney

ATTORNEYS

3,709,327

METHOD AND SYSTEM FOR SORTING SPHERICAL ARTICLES

BACKGROUND OF THE INVENTION

In the production of fibrous glass products, one method of obtaining such products requires a supply of glass marbles which are guided for rolling travel to the melter from which the glass fibers are drawn. The bulk supply of glass marbles frequently contains half marbles and chips therefrom which can cause jams stopping marble flow. Other foreign materials have been known to find their way into the bulk supply, for example, weld rod. Foreign materials which reach the glass melting apparatus can disrupt the melt and often plug the orifices from which the melted glass is drawn. Disruptions of the above nature cause an uneven quantity of glass to flow resulting in an inferior fibrous glass product.

To overcome the above difficulties, the glass marbles were separated from the other materials in the bulk supply by passing the mixture over grid bars or screens which were patterned and sized to allow chips and half marbles to drop through while passing the marbles on for further processing.

The apparatus and method disclosed herein improves on previous methods and apparatus for sorting glass marbles and articles of a spherical shape. Non-rolling articles are readily discerned from rolling or spherical articles and used as one means to separate spherical articles from a product mix. Foreign materials previously undiscernable in the prior art methods are separated out by the present system and the flow of spherical articles through the system is controllable to meter the quantity of spherical articles flowing.

SUMMARY

The present method and system relates to sorting and metering spherical articles and more particularly to sorting and metering glass marbles from a product mix. The product mix is supplied from a supply source to an enclosure open at two ends having within it a maze of nested guides forming curved paths which the product mix must follow in flowing through the enclosure. Elongated materials of sufficient length cannot negotiate the curved path of the guides in the enclosure and are retained at the entry of the enclosure from which they can be removed since it is open. At the exit of the enclosure, the product mix and marbles therein are deposited on conveying means, illustrated as a continuous moving belt in the preferred embodiment and exit the enclosure through an orifice framed by margins on the enclosure and conveying or transporting means. The marbles exit the enclosure in generally rank configuration with the remainder of the mix intermingled therebetween. The belt transports the product mix to a deflecting means preferably a grading bar which is positioned above and oblique to the direction of the conveying means with sufficient clearance to pass a predetermined size of under sized materials such as half marbles, while restraining the marbles. Non rolling material of a size exceeding the clearance of the grading bar is gripped firmly enough by the belt to force the material beneath the grading bar by deflecting the grading bar and/or the belt. The restrained marbles are then deflected along the grading bar to a collection point by virtue of the angularity of the grading bar with respect to the direction of movement of the belt while at the same time the combined rolling and sliding action imparted to the marbles by belt and grading bar result in a single file configuration of the marbles along the grading bar. The remainder of the product mix retained on the belt is transported to a collection point separate from that of the marbles.

The above method and system is one capable of sorting out non rolling as well as undersized and foreign materials from a product mix. Further, half marbles and chips which can cause jams stopping marble flow are eliminated, and disruptions in the melted glass from foreign material is avoided. Thus, the system helps achieve a more uniform product of fibrous glass of a high quality. The system and method are more efficient than prior grid bar screening, and the flow through the system is metered at the same time the sorting occurs with the capability to deliver one marble at a time increasing metering accuracy over the blast gate control.

DESCRIPTION OF THE PREFERRED EMBODIMENT

Figure 1:
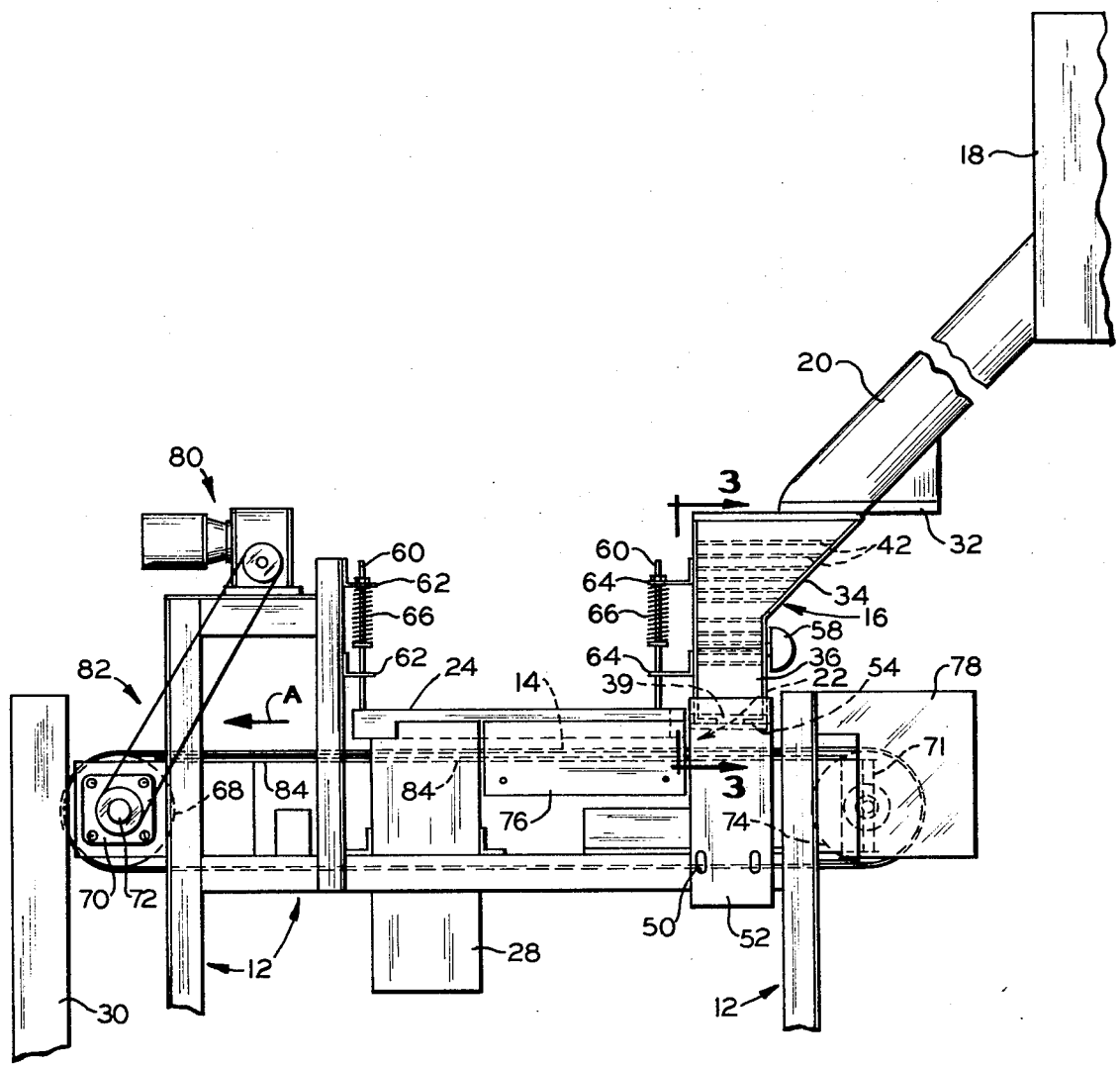
FIG. 1 is an elevational view of the sorter being fed from a storage bin by an intermediate trough conveyor.
Figure 2:
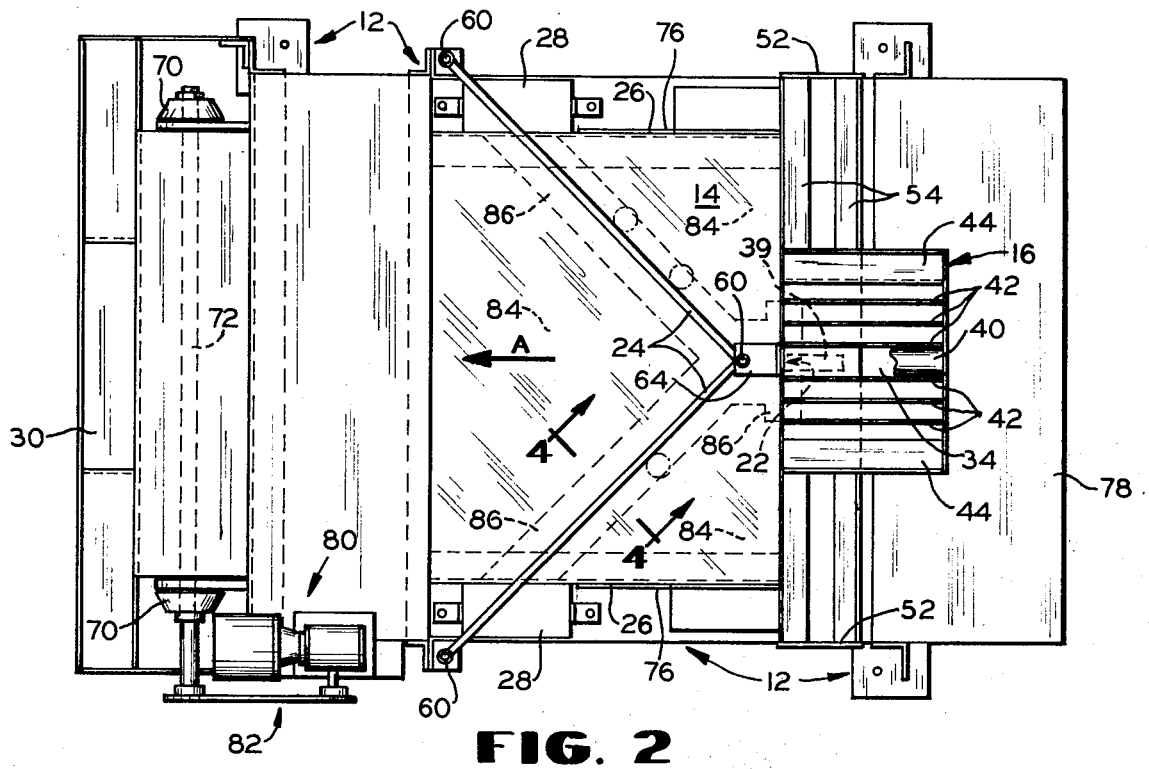
FIG. 2 is a plan view of the sorter with the storage bin and trough conveyor removed.

Referring to FIGS. 1 and 2 an elevational view of the preferred embodiment of the sorter is illustrated consisting of a structural frame 12 which supports a driven belt 14 located beneath a separator hopper 16. The separator hopper 16 is fed from the supply bin 18 by means of trough 20 extending therebetween.

In the sorting process the supply bin holds a mix of glass marbles, half marbles, chips of marbles and possible foreign materials, for example, weld rod, all of which flow from the supply bin 18 down the trough 20 which may be vibrated by any conventional means, for example, pneumatic cylinders, to facilitate flow of the mix to the separator hopper 16. Upon entering the separator hopper 16, the materials are caused to flow between a series of guides which restrict the flow of materials having an elongated shape, such as the above weld rod, while allowing the remainder of the mix to be metered through an orifice 22 at the bottom of the separator hopper 16 and pass onto the moving belt 14. Upper run of belt 14 moves in the direction of arrow A so that the mix is carried by the belt 14 toward the grading bar 24 (best illustrated in FIG. 2) which engages the glass marbles thereby deflecting them to the margins 26 of the belt 14 where they are collected in feeder chute 28 from which they pass on for further processing in the production of fibrous glass products. Chips and non spherical articles are passed beneath the grading bar 24 and carried by the belt 14 to the reject chute 30. In the process, only spherical marbles are passed to the feeder chute 28 to continue on to the melters.

The system for sorting and metering can be fed by any convenient source of supply of mix and intermediate transfer means taking the place of the supply bin 18 and trough 20 communicating with separator hopper 16. Likewise the blast gate 32 illustrated at the discharge end of the trough 20 can be replaced with other means, for example, a swinging gate or driven paddle wheel, to achieve the rough regulation of flow of mix and/or to supplement the flow regulation of the orifice on the separator hopper 16.

Figure 3:
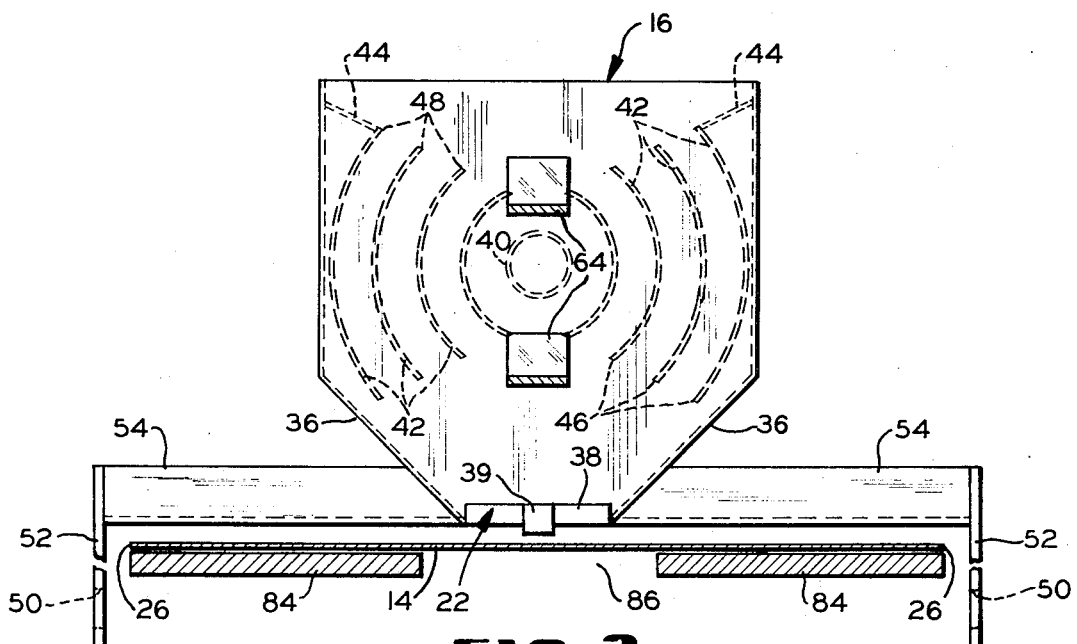
FIG. 3 is an enlarged fragmentary view of the sorter taken along line 3—3 of FIG. 1.

FIG. 3 illustrates the separator hopper or hopper 16 and orifice 22 in greater detail. Except for the 45° lip 34 (see FIG. 1) which accommodates the trough, the upper portion of the enclosure is rectangular in shape when viewed from the top. The bottom portion has two tapered sides 36 at 45° angles to the vertical center line of the hopper 16 and converging toward each other. For processing three-fourths inch diameter marbles, these converging tapered sides 36 terminate approximately 5 inch from each other to form two sides of an opening in the bottom of the hopper 16. The other two sides of the bottom portion of the hopper 16 are parallel to the vertical center line and each other, and thus complete the rectangular frame for the hole in the bottom of the hopper. The side of the hopper 16 facing in the direction of flow is cut back from the bottom edge to create an orifice 22 between the belt 14 and the top of the slot 38 thus created when the hopper 16 is properly positioned above the belt 14. A divider bar 39 having a three-fourths inch square cross section is affixed to the hopper 16 at the bottom opening to divide both the bottom opening and the orifice 22. With the divider bar 39 in place there is ample clearance to pass two three-fourths inch diameter marbles on both sides of the divider bar 39. It has been found that with the top of the slot 38 located approximately 1⅛ inch above the top of the belt 14, four marbles at a time are discharged with the advance of belt 14 from the hopper 16 in a generally rank formation. These dimensions as well as the size of the hopper can be adjusted to accommodate other size marbles and clearly the hopper is suitable for sorting any spherical items not just glass marbles. The hopper 16 is open at the top to receive the flow of mix thereto. Guides 42 extend across the narrow dimension of the hopper 16 and are affixed to the sides of the hopper 16 against which they abut. The guides 42 of the preferred embodiment are in the form of segments of concentric right circular cylinders equally spaced over the internal length of the hopper 16 from a right circular cylinder 40 located on the vertical centerline of the hopper 16. The guides 42 are confined by the insides of the hopper 16 and extend over both the upper and lower portions thereof. The entry ends 48 of the guides are arranged to fall on a line having an approximately 64° angle with the vertical centerline of the hopper 16 in both directions from the guide closest to the cylinder 40 outward and upward. The guides 42 farthest from the cylinder 40 have a plate 44 the width of which falls upon the above line, thereby closing over the opening between these guides 42 and the adjacent sides of the hopper 16. With the above configuration at the entry end 48 of the guides 42 the mix entering the hopper 16 is prevented from wedging between the outermost guides 42 and the hopper 16 while being deflected inward for distribution over all the guides 42. The exit ends 46 of the guides are positioned approximately tangent to the tapered sides 36 of the hopper 16 for a smooth transition of the mix flow from the guides 42 to the hopper 16.

The nesting of the guides 42 create curved paths which the mix must follow if it is to pass through the hopper 16. For three-fourths inch diameter marbles it has been found that a 1¼ inch wide path between each of the guides is adequate. Guides 42 are arrayed so that no straight passage exists through the maze they form. That is, a chord from the upper lip 48 to the lower lip 46 of any of the guide elements 42 other than the central cylinder will intersect the wall of the next guide element 42 or 40 inward therefrom. This limitation can be relaxed to the extent that the guide elements can be oriented so that parallel planes can be defined by the upper and lower lips 48 and 46 of a first guide element 42 for a first plane and a tangent to the outer surface of the next guide element 42 or 40 inward therefrom for a second plane provided the first plane is spaced outward from the second plane less than the thickness of the thinest straight element of length exceeding the longest chord to be separated from the flow of spheres. The elongated material of the rod nature cannot negotiate the curved path between the guides 42 and, therefore, is retained at the top of the hopper 16. Since the hopper 16 is open at the top the retained materials can be readily removed.

If a distance is maintained between the parallel sides of the hopper 16 which is slightly less than the above length of the longest chord, the straight element will be prevented from passing through the guides 42 by orienting itself with its longitudinal axis parallel to the axis of the cylinder 40 to thereby pass between the guides 42.

The present concept is not limited to the preferred embodiment illustrated, rather the rectangular shape of the hopper 16 and cylindrical shape of the guides 42 are convenient shapes. A round hopper would also be functional and any configuration of guides 42 which are nested to create curved paths suitable for flow of spherical articles while restraining elongated materials will meet the requirements. Further, the spacing of the guides 42 in the maze can be varied, particularly where the inner guide elements 42 are spaced greater than the outer elements 42, provided the minimum spacing exceeds the maximum sphere diameter to be passed. The cylindrical plates of the preferred embodiment are 16 gauge stellite, but other suitable gauges and materials may be used.

Adjustment of the hopper 16 for proper orifice 22 size is obtained by the slotted apertures 50 of attachment plates 52 which allow the spacing of the hopper 16 from the belt 14 to be adjusted. The attachment plates 52 are bolted to the frame 12, illustrated in FIG. 1, and support the hopper 16 through the interconnecting structural angles 54.

To increase the efficiency of flow of the mix through the hopper 16, a vibrator 58 can be added thereto, for example, a "Pulsating Magnet" Electric Vibrator, Syntron Model V-20.

FIG. 2 is a plan view of the system with the trough 20 and supply bin 18 removed, and best illustrates the grading bar 14. The grading bar 24 is of a "v" shape extending from the divider bar 39 outwardly at a 45° angle to the direction of flow and passing over the feeder chutes 28 located at the margins of the belt 14.

The grading bar 24 is positioned above the surface of the belt 14 a distance slightly less than the diameter of the marbles by rods 60 bolted to clips 62 and 64 attached to the frame 12 and hopper 16 respectively. Springs 66 on the rods 60 can be used to allow the grading bar to deflect upward to pass oversized non rolling articles thereunder. While other shapes of grading bars 24 can be used and the angle of the "v" shaped grading bar 24 can be varied over a wide range, the 45° angle of a "v" shaped bar is preferred for optimum flow of spherical articles and sorting of oversized non rolling articles.

The marbles released from the orifice 22 in generally rank configuration are carried by the belt 14 to be engaged by and deflected along the grading bar 24 to the feeder chute 28. The action of the marbles resulting from the combination of being driven by the belt 14 and deflected by the grading bar 24 is one of rolling and sliding to form a single file of marbles along both legs of the "v" shaped grading bar 24. The release of a generally rank configuration of marbles from the orifice 22 combined with the single file advancement of the marbles along the grading bar 24 results in an accurately metered flow of marbles to the feeder chute 28.

The ability to pass oversized non rolling articles beneath the grading bar 24 is due to the flexible, rough surface of the belt 14. As best illustrated in FIG. 1, the belt 14 is a continuous loop driven continuously by drive drum 68 rotatably mounted on the structural frame 12 by the bearings 70 which support its shaft 72. The other end of the loop of belt 14 passes around an idler drum 74 supported in a manner similar to the drive drum 68 having takeup bearing blocks 71 to allow proper tension to be applied to the belt. An example of belt having the flexibility and surface roughness required is neoprene surface conveyor belting used in inclined conveyors. The belt 14 has flexure normal to its surface and a high coefficient of friction causing non rolling articles to follow the direction of the belt 14 which has firm contact with them while rolling articles, i.e., the spherical articles, are rotated upon contact with the grading bar 24 giving them greater freedom which allows them to move along the grading bar 24.

As in the case of the hopper 16, the grading bar 24 and belt 14 combination can be adjusted to accommodate other sized articles as well as being capable of handling spherical articles other than glass marbles.

FIGS. 1 and 2 also illustrate side guards 76 for retaining all articles upon the belt located at the margins thereof between the feeder chute 28 and hopper 16. A guard 78 encloses the idler drums 74 and the reject chute 30 guards the drive drum 68 with both guard 78 and reject chute 30 being mounted on the structural frame 12. Also mounted on the structural frame 12 is the motor-reducer 80 providing power for driving the drive drum 68 through a chain and sprocket set 82. Other drive means could be used, e.g., a hydraulic motor.

The belt 14 is supported by a bed plate 84 which extends over both the width and the upper length of the belt 14 between the drive and idler drums 68 and 74. The bed plate 84 has a cut-away 86 indicated by hidden lines in FIG. 2, in the area directly beneath the grading bar 24 and the lip 38 defining the upper margin of orifice 22. Since the belt 14 is flexible, over-sized articles passing the orifice 22 or grading bar 24 can deflect the belt 14 into and below the plane of the bed plate at these points when additional clearance is required.

Figure 4:
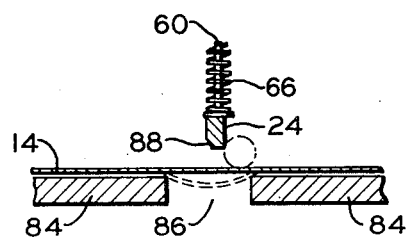
FIG. 4 is an enlarged fragmentary sectional view of the sorter taken along line 4—4 of FIG. 2.

FIG. 4 illustrates the cut-away 86 beneath the spring loaded grading bar 24 as described above. The spring loaded grading bar 24 and cut-away 86 in the bed plate can be used alone or together as required by the type and size spherical articles to be processed. The deflection of the belt is shown in phantom as well as a three-quarter inch marble to show its relationship to the grading bar 24. The grading bar is shown in cross section as being generally rectangular with the lower corner facing in the direction of flow of the belt cut off to form a quick relief plane 88 to articles passing beneath the bar which contact it in passing. For a three-quarter inch spherical article and its mix it was found that a cut-away 86 of three inch width below the grading bar and 4 inch width beneath the orifice 22 are suitable.

Other shapes of grading bars may be used, for example, a straight round bar.

In describing the operation of the above system, it is assumed that the supply bin 18 is filled with a product mix of glass marbles, half marbles, marble chips, materials of generally marble size which are non-rolling, e.g., marbles with flat areas, and elongated materials, for example, weld rod having a long length as compared to its small diameter. The product mix is transferred from the supply bin 18 by the trough 20, which may be vibrated to aid the flow of material, past the blast gate 32, where rough metering can be accomplished as required, and into the separator hopper 16. In the hopper 16, all the materials of the product mix are directed by gravity through the curved paths between the guides 42 and released generally tangential to the tapered sides 36 of the lower portion of the hopper 16 except the elongated materials. Elongated materials, such as weld rod, are retained by the hopper 16 because the width or thickness of the material is greater than the clearance between the ends 46 and 48 of the guides 42 and the point of curvature of the inwardly adjacent guide 42 closest to a line passing through both ends 46 and 48 of the guides, thereby preventing the elongated material from dropping directly through the hopper 16. When the elongated material enters the hopper 16 with its end oriented to pass through a path between the guides 42 and attempts to follow the curved path its length is sufficient to cause it to wedge between the guides which have a curvature sufficient to prevent all elongate materials of a predetermined length and longer from negotiating the path. The remainder of the mix passes through the hopper 16, which also can be vibrated to aid flow of mix therethrough, by passing through orifice 22. Use of a "v" shaped grading bar 24 can be augmented by a divider bar 39 in the center of the orifice 22 to divide the mix flow. The divider bar 39 extends across the bottom of the hopper 16 thus dividing the flow of mix approaching the orifice 22. Two marbles in generally rank configuration pass from each side of the divider bar 39 through the orifice 22, the flow being metered by proper sizing of the orifice 22. The marbles are caused to flow through the orifice 22 by a combination of the head of material in the hopper 16 and the movement of the belt 14 which contacts the marbles in the bottom opening of the hopper 16. The marbles, upon exiting the orifice 22 are transported by the belt along with any intermingled mix such as foreign material, chips, half marbles, and marbles having flat surfaces toward the grade bar 24. All undersized materials in the mix are further transported by the belt 14 beneath the grading bar 24, which is set at a predetermined clearance above the belt 14, to a reject chute 30. Only two materials of the original product mix remain, the marbles and material of a size large enough not to pass freely under the grading bar 24 which is incapable of rolling such as marbles with flat areas and other non-rolling articles. Articles incapable of rolling are engaged firmly enough by the rough surface of the belt 14 to force them beneath the grading bar 24 by either deflecting the belt 14 into the area of the cut-away 86 beneath the grading bar 24 or by deflecting the grading bar 24 away from the belt against the force of the springs which maintain its position or both. Only the marbles are restrained by the grading bar 24 to be deflected along the bar 24 to the feeder chute 28 from which they can be fed to the melters or like type process equipment. The combination of driving the bottom of the marbles with the belt 14 while restraining the marbles from above with the grading bar 24 causes the marbles to rotate against the grading bar 24 while the angularity of the grading bar 24 with respect to the direction of flow of the belt 14 causes the marbles to advance along the grading bar 24 to the feeder chute 28. At the same time the combined rotating and sliding action of the marbles together with the generally rank release of marbles from the orifice 22 results in the marbles being advanced along both sides of the "v" shaped grading bar 24 in single file fashion which gives accurate metering of the quantity of marbles entering the feeder chute 28, i.e., one at a time metering.

While the preferred embodiment of the above system illustrates a vertically mounted separator hopper 16 in combination with a belt drive and grading bar, it will be appreciated that the concept of the system is not limited to vertically oriented hoppers nor belt drives. Motive means other than gravity could be used to pass the mix through non-vertical hoppers, for example, a fluid drive, and other means for transporting the articles from the hopper such as a series of shoes pushed one against the other could be used.

A system has been described which improves on the methods of sorting spherical articles from a product mix and which can distinguish rolling from non-rolling articles. As result, half marbles and chips therefrom which can cause jams stopping marble flow in the production of fibrous glass products are eliminated and an even quantity of glass flow to the melters is achieved. Further, foreign materials which can plug the orifices from which the melted glass is drawn are eliminated also. The system and method is more efficient than the previously used grid bars. The flow is metered at the same time that sorting takes place and marbles are fed from the system to collection points one at a time for more accurate metering.

What we claim is:

1. A system for sorting and metering spherical articles from a mix of materials including non rolling material, over and undersized articles and elongated materials comprising:
   a supply source of mix;
   a collector for spherical articles;
   a conveying path between said supply source and collector wherein said collector is downstream of said supply source;
   means in said path for passing the spherical articles of the mix while restricting oversized articles and elongated materials of a predetermined size including a plurality of guides spaced to define non-linear passages for the conduction of the spherical articles to an exit therefor;
   transporting means having a surface located downstream of said means for passing the mix for receiving the portion of the mix conducted through said passing means at the exit of said passing means;
   walls on said means for passing the mix adjacent the exit thereof, one of said walls having a margin spaced from said transporting means surface a distance exceeding the diameter of the spherical articles, said margin forming an orifice for metering the flow from said means for passing the mix to a generally single rank of spherical articles extending across said conveying path on said transporting means; and
   means in said conveying path and operatively associated with said transporting means for deflecting the spherical articles on said supporting means into single file to said collector.

2. The system according to claim 1 wherein said transporting means is a belt, and means for driving said belt along said conveying path.

3. The system according to claim 2 wherein said belt is flexible normal to the surface thereof.

4. The system according to claim 2 wherein said belt has a surface with a large coefficient of friction.

5. The system according to claim 4 including a bed to support said belt over a portion of the surface region opposite said surface with a large coefficient of friction.

6. The system according to claim 5 wherein said bed has a cut-away in registry with said means for deflecting and said margin forming an orifice.

7. The system according to claim 2 wherein said collector for spherical articles is located laterally of said belt and including a collector at the discharge end of said belt.

8. Apparatus for separating spherical articles from a mix of articles of various geometric forms comprising a chute for said mix and including a maze having non-linear paths thereof a width at least the diameter of the maximum diameter spherical article to be passed for passing the mix of materials while restricting over-sized articles and elongated materials of a predetermined size, said maze having no straight passage extending entirely therethrough.

9. The apparatus according to claim 8 wherein said chute is enclosed to form a duct.

10. The apparatus according to claim 9 wherein said duct has a portion of at least two sides converging toward the center thereof.

11. The apparatus according to claim 10 wherein said maze is a plurality of nested curved guides having the adjacent guides spaced to form said paths as curved paths.

12. The apparatus according to claim 11 wherein said guides are concentric cylindrical segments extending in two directions from the center of said maze.

13. The apparatus according to claim 12 wherein said segments have discharge ends, said ends defining a line generally perpendicular to said converging sides adjacent said segments respectively.

14. The apparatus according to claim 12 wherein said segments have charge ends, said charge ends being staggered on lines extending from the longitudinal centerline of said duct outward, and in the direction counter to the flow through said duct.

15. The apparatus according to claim 11 wherein said guides have charge and discharge ends and are spaced such that the distance between a first plane passing through said charge and discharge ends and a second plane paralleling said first plane and passing through the point of tangency with the curvature of the inwardly adjacent guide thereto is slightly less than the predetermined width of the elongated materials to be separated from said mix.

16. The apparatus according to claim 10 including a divider bar across the opening between said converging sides of said duct dividing the opening between said sides.

17. Apparatus for separating essentially spherical articles of a substantially uniform diameter from a mix of articles including nonspherical articles and said spherical articles, which comprises:
  a. transporting means adapted to receive said spherical articles from a source thereof and to convey said received spherical articles along a conveying path to a position adjacent to a collector for said spherical articles;
  b. said collector positioned along said conveying path and adjacent to said transporting means, and adapted to receive said spherical articles from said transporting means;
  c. a deflector bar positioned obliquely transversely across said conveying path on said transporting means, with the shortest distance between the lower edge of said deflector bar and said transporting means being less than said diameter of said spherical articles, and said deflector bar being adapted to deflect only said spherical articles from said transporting means to said collector; and
  d. sorting means cooperating with at least one of said transporting means and said deflector bar such that in response to the contact of a nonspherical article simultaneously with both said deflector bar and said transporting means, said sorting means provides means of movement to at least one of said deflector bar and said transporting means to increase said shortest distance between said transporting means and said lower edge of said deflector bar, whereby said nonspherical article remains on said conveyor means, passes said deflector bar, and is not deflected into said collector.

18. The apparatus according to claim 17 wherein said bar is "V" shaped with the apex of the "V" directed into the flow of mix.

19. The apparatus according to claim 17 wherein said sorting means comprises spring loaded means to allow deflection of said bar normal to said transporting means, and outwardly therefrom.

20. The apparatus according to claim 19 wherein said bar is generally rectangular with the corner facing in the direction of conveyance of said transporting means and adjacent thereto chamfered, whereby the articles engaging said bar and passing thereunder are given quick relief from said bar in moving away therefrom.

21. The apparatus according to claim 17 wherein said transporting means is a belt, and means for driving said belt along said conveying path.

22. The apparatus according to claim 21 wherein said belt has a surface with a large coefficient of friction.

23. The apparatus according to claim 22 including a bed to support said belt over a portion of the surface region opposite said surface with a large coefficient of friction.

24. The apparatus according to claim 17 wherein said sorting means comprises a cutaway region in registry with said bar.

25. The apparatus according to claim 18 including a divider bar having its length parallel to the conveying path and aligned with the apex of the V of the deflecting bar, said divider bar being located in said orifice whereby spherical articles are prevented from issuing from said orifice in alignment, along the conveying path with said apex.

26. A system for sorting and metering spherical articles from a mix of materials including non-rolling material, over and undersized articles and elongated materials, having a supply bin, trough and blast gate as well as feeder and reject chutes, and comprising:
  a hopper having walls open at the top and bottom thereof having a series of cylindrical segments with charge and discharge ends nested and spaced across the flow path of said hoppers thereby forming curved paths such that the distance between a first plane passing through said charge and discharge ends of each segment and a second plane paralleling said first plane and passing through the point of tangency with the curvature of the inwardly adjacent segment thereto is slightly less than the predetermined width of the elongated material to be restrained from passing along said paths;
  a rough surfaced flexible driven belt for transporting the mix of materials at the bottom of said hopper, said belt being located beneath said bottom hopper opening with the clearance between said hopper and said belt surface being less than the diameter of said spherical articles;
  said hopper wall facing the direction of drive of said belt having an aperture at the bottom thereof the margin of which is spaced from said belt a distance greater than the diameter of said spherical articles for metering the flow from said hopper to a single rank of said spherical articles;
  a "v" shaped grading bar centered above said belt surface with a clearance less than the diameter of said spherical articles, said bar being located downstream of said orifice in the direction of drive of said belt and extending over the longitudinal margins of said belt terminating above the feeder chute for deflecting said spherical articles into the feeder chute; and
  a bed supporting said belt having a cutaway region in the areas beneath said grading bar and said aperture margin to allow said belt to deflect in passing oversized articles through said aperture and non-rolling material beneath said grading bar.

27. In a system for sorting and metering spherical articles from a mix of materials including non-rolling articles, elongated materials, and undersized material, the method comprising the steps of:
  a. passing the mix of materials through curved paths having radii of curvature to restrain the flow of elongated material therethrough, while passing the remainder of the mix;
  b. directing the remainder of the mix to a metering point;
  c. metering said spherical articles received from a supply source in generally a single rank;
  d. transporting said spherical articles away from the metering point;
  e. deflecting said spherical articles by engagement at an upper surface; and
  f. simultaneously separating said spherical articles from said mix of materials while advancing said spherical articles in single file oblique to the direction of said transporting to a collection point by causing a rolling and sliding action of said spherical articles when deflecting said articles.

* * * * *